United States Patent [19]

Mathias

[11] 4,307,748

[45] Dec. 29, 1981

[54] SEALING DEVICES FOR BLEED SCREWS

[75] Inventor: Christopher N. Mathias, Henley-in-Arden, England

[73] Assignee: Lucas Industries Limited, Birmingham, England

[21] Appl. No.: 76,493

[22] Filed: Sep. 17, 1979

[30] Foreign Application Priority Data

Sep. 26, 1978 [GB] United Kingdom ............... 38095/78

[51] Int. Cl.$^3$ ........................ B65D 43/10; E03F 5/14; F16K 51/00
[52] U.S. Cl. ..................................... 137/381; 215/307; 222/182; 277/237 R; 251/351
[58] Field of Search ...................... 123/180 R; 215/307; 277/166, 237 R; 251/351, 352; 137/381; 227/562, 182

[56] References Cited

U.S. PATENT DOCUMENTS

| | | | |
|---|---|---|---|
| 2,815,039 | 12/1957 | Pickavance | 137/381 |
| 2,884,151 | 4/1959 | Biederman | 215/307 |
| 3,148,670 | 9/1964 | Fiedler et al. | 137/353 |
| 3,205,882 | 9/1965 | Fiedler et al. | 123/180 R |
| 3,710,989 | 1/1973 | Armour | 222/562 |
| 3,758,000 | 9/1973 | Mack | 222/562 |
| 3,871,401 | 3/1975 | Lyons | 137/381 |
| 3,872,882 | 3/1975 | Fjermestad | 137/381 |

FOREIGN PATENT DOCUMENTS 1493276 7/1967 France ............... 215/307

Primary Examiner—Robert I. Smith
Attorney, Agent, or Firm—Scrivener, Clarke, Scrivener and Johnson

[57] ABSTRACT

A sealing device for use with a bleed screw of an hydraulic system comprises a one-piece moulding of rubber or plastics material. The sealing device comprises a sealing ring of frusto-conical outline, an end cap, and a flexible strip interconnecting the ring and the cap. In its position of use the sealing ring is clamped between a shoulder on the bleed screw and a plain face on a caliper which surrounds a threaded bore into which the bleed screw is screwed. This prevents foreign matter from entering the screw threads externally. The end cap is detachably deformed over a bead at the free end of the bleed screw to prevent moisture or foreign matter from entering the bore through a bleed passage in the bleed screw.

5 Claims, 3 Drawing Figures

SEALING DEVICES FOR BLEED SCREWS

SPECIFIC DESCRIPTION

This invention relates to sealing devices for protecting bleed screws for hydraulic systems from foreign matter.

The presence of dust and moisture around a bleed screw induces corrosion between the threads of the screw and an opening in a body into which the screw is releasably screwed. In a totally unprotected bleed screw this corrosion can start externally between the threads and the body, or internally at the bottom of the threads since moisture can find its way down the bleed passage in the bleed screw. In extreme cases the bleed screw can seize in place. Thus the torque required to release the bleed screw for bleeding purposes is variable and may cause the threads to strip. Thus the body may have to be written off.

This applies particularly to brake calipers and other brake actuator parts which are often mounted in exposed positions and is particularly likely to occur when such components are manufactured from aluminium or aluminium alloys which are less likely to withstand any tendancy for the threads to strip when undue force is used.

One solution to the problem of corrosion is to anodise or aluchrome an aluminium component or component of an aluminium alloy. This of course is expensive.

It is known to provide a removable rubber cap which covers the projecting end of a bleed screw to prevent moisture and dust from reaching the threads through the bleed passage. No protection is provided for the outer threads, nor is there any means for retaining the cap during the bleeding process, or for preventing the cap from becoming detached from the screw in service.

According to our invention we propose a sealing device for use with a bleed screw of an hydraulic system, the bleed screw being of the kind which is adapted to be screw-threadably received in a threaded-bore in a body and includes a radial shoulder which is spaced axially from a face on the body surrounding the threaded bore when the screw is screwed into the bore, the sealing device comprising a sealing ring adapted to be clamped between the radial shoulder and the face, a cap of resilient material for detachably enclosing the projecting end of the screw, and a connecting strip of flexible material interconnecting the ring and the cap to prevent the cap from being separated from the screw after removal of the cap from the projecting end of the screw.

When clamped in position the sealing ring prevents foreign matter from entering the screw threads externally and, when the cap is in position, the outer end of the bleed passage is closed so that no foreign matter can reach the bottom of the threads through the bleed passage.

During bleeding only the cap needs to be removed to permit the screw to be loosened. Thus there is no possibility of the sealing device being lost since the sealing ring which encircles the screw is still retained between the shoulder and the face.

Conveniently the sealing ring, the cap, and the connecting strip are formed as a one-piece moulding from a resilient material, suitably rubber or a plastics material.

In one construction the cap has a plain cylindrical inner surface which is adapted to be deformed over a radial flange adjacent to the outer end of the bleed screw, and the sealing ring is of frusto-conical outline of which the end of smaller diameter is adapted to be clamped against a face at the intersection of the radial shoulder and a shank of the screw which is screwed into the threaded bore, and the end of greater diameter is adapted to be clamped against an area of the face which is spaced radially from the shank and the threads. This ensures that there is no danger of the sealing ring being damaged as the screw is screwed home into the bore.

One embodiment of our invention is illustrated in the accompanying drawings in which.

Figure 1:
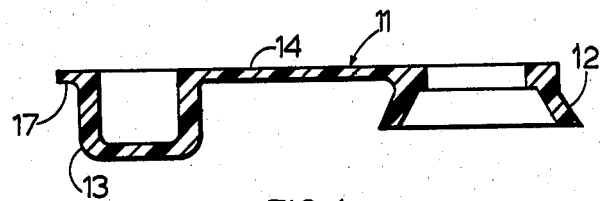
FIG. 1 is a longitudinal section through the sealing device in an unstressed condition.
Figure 2:
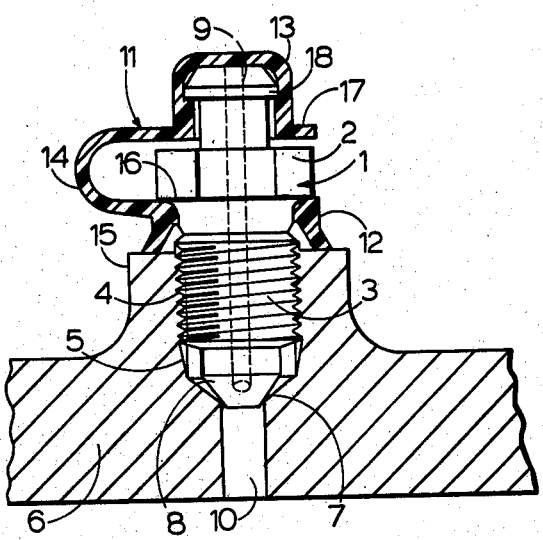
FIG. 2 is a section through a brake caliper and bleed screw with the sealing device in an operative position.
Figure 3:
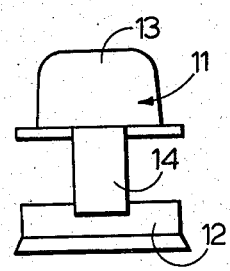
FIG. 3 is a side view of the sealing device in its operative position of FIG. 2.

In the drawings a bleed screw 1 has a shoulder 2 of hexagonal outline at an intermediate point in its length. A threaded shank 3 on one side of the shoulder is screwed into an enlarged threaded portion 4 of a bore 5 in a brake caliper 6. When the bleed screw 1 is screwed home, a conical portion 7 of reduced diameter engages sealingly with a shoulder 8 at a step in diameter in the bore 5. This isolates the inner end of an axial bleed passage 9 in the screw 1 from an inner portion 10 of the bore 5 which is of smaller diameter. A sealing device 11 comprising a one-piece moulding of rubber or plastics material comprises a sealing ring 12 of frusto-conical outline, an end cap 13, and a flexible strip 14 interconnecting the ring 12 and the cap 13.

The sealing ring 12 is clamped between the shoulder 2 and a plain face 15 on the caliper 6 which surrounds the bore 5. The end of the sealing ring 12 which is of smaller diameter also seals against an arcuate face 16 at the intersection of the shoulder 2 with the shank 3, and the end of the ring 12 which is of greater diameter seals against a region of the face 15 which is spaced radially from the bore 5.

The cap 13 is of top-hat section with a radial flange 17 at the open end of the cap 13 being integrally connected by the strip 14 to the adjacent end of the sealing ring 12 which is of smaller diameter.

The cap 13 is detachably deformed over a bead 18 at the free end of the bleed screw 1 with the strip 14 being bent around the flange 2. In this position the cap 13 prevents moisture or foreign matter from entering the bore 5 through the bleed passage 9.

To bleed the caliper 6, the cap 13 is simply removed from the bleed screw 1, and the bleed screw 1 loosened to place the bleed passage 9 in communication with the bore portion 10. Since the sealing ring 2 is still located between the shoulder 2 and the face 15 there is no possibility of the sealing device 11 being separated from the bleed screw 1.

I claim:

1. In combination: a bleed screw of an hydraulic system, and a sealing device, said bleed screw being of the kind which is adapted to be screw-threadably received in a threaded-bore in a body and includes a radial shoulder which is spaced axially outwardly from a face on said body surrounding said threaded bore when said screw is screwed into said bore, and a projecting outer end of said screw projecting from said bore, and said sealing device comprising a sealing ring clamped between said radial shoulder and said face to provide a seal therebetween, a cap of resilient material detachably enclosing said projecting end of said screw, and a connecting strip of flexible material interconnecting said ring and said cap to prevent said cap from being separated from said screw after removal of said cap from said projecting end of said screw.

2. The combination as claimed in claim 1, wherein said sealing ring, said cap, and said connecting strip are formed as a one-piece moulding from a resilient material.

3. The combination as claimed in claim 2, wherein said resilient material is rubber.

4. The combination as claimed in claim 2, wherein said resilient material is a plastics material.

5. The combination as claimed in claim 1, wherein said cap has a plain cylindrical inner surface which is adapted to be deformed over a radial flange adjacent to said outer end of said bleed screw, and said sealing ring is of frusto-conical outline having an end of smaller diameter which is clamped against a face at the intersection of said radial shoulder and a shank of said screw which is screwed into said threaded bore, and an end of greater diameter which is clamped against an area of said face which is spaced radially from said shank and said threads.

* * * * *